Patented Oct. 4, 1938

2,132,138

UNITED STATES PATENT OFFICE 2,132,138

METHOD OF APPLYING A LUBRICANT COATING TO GLASSWARE

Robert C. Williams and Hugh M. Bone, Columbus, Ohio, assignors to The Ironsides Company, Columbus, Ohio, a corporation of Ohio No Drawing. Application January 17, 1935, Serial No. 2,198

2 Claims. (Cl. 91—70)

This invention relates to the treatment of the exterior surfaces of glass ware, such as bottles, tumblers and the like, which are subjected to abrasive contact with each other during handling or shipment. An object of the invention is to treat the surfaces of such glass ware to produce thereon a film comprising a lubricant of a non-injurious character to the glass ware so that when such articles contact with one another, marring or injuring the engaging surfaces through abrasion or frictional contact will be prevented or reduced to a minimum.

Newly made milk bottles, for example, become readily scratched or marred when rubbed against one another even lightly. When conditions during handling or shipment are such as to produce considerable interaction among such articles of glass ware, the appearance not only becomes objectionable due to mars, scratches or the like, but the resistance to breakage is greatly reduced, the value of the product being correspondingly impaired and breakage losses increased.

The present method of handling glass ware of the character indicated is to pack such ware in crates with each article insulated from adjacent articles with paper or other insulation. This is a relatively costly process of packing compared with merely loosely placing the ware in a boxcar or other shipment vehicle. Heretofore the loose packing of glass ware has not been desirable due to the deterioration of the pieces as described. The present invention permits of this bulk handling of glass ware through the application of a lubricating compound to the exterior surfaces thereof, and a consequent reduction in the cost of handling and shipping together with economy incurred through the reduction of breakage. The present invention is based on the discovery that certain materials may be applied to the surface of glass ware, taking the form of thin films, which are capable of preventing the scratching of one piece of glass ware by another as they rub or interact mechanically.

There are certain desirable properties of glassware lubricants in addition to the property of effectively preventing scratching of the ware. For instance, the lubricant should be invisible. Again, the lubricant should not react with the glass over a long period of time to produce any visible change in appearance of the glass. Also the lubricant should be of such a nature that it may be easily removed from the glassware by the standard alkali washes commonly given such ware before it goes into service. It is desirable further, that the lubricant shall be water resisting so that the glass surface to which it is applied will be protected against leaching.

We have found that dilute dispersions or solutions, of the order of 2% or less, of various fatty acids, such as stearic or oleic acid in ammonia water to be very effective as lubricants for glassware in attaining the ends and advantages of the present invention. Lubricant solutions, such as described, may be applied advantageously by spraying the ware as it moves toward the cold or discharge end of an annealing lehr. Thus the ware may be subjected to a fine spray of the lubricant while at a temperature of the order of 200° F. At such a temperature, the heat of the ware is sufficient to quickly drive off the water and ammonia. In case of a solid dispersed lubricant, such as stearic acid, the heat of the ware melts this type of lubricant, causing it to spread evenly in the form of an invisible film over the glass surfaces.

Other lubricants which have been found to be useful in accomplishing the purposes of the present invention are emulsions of paraffin wax or mineral oils in water when the ammonia soaps are used as emulsifying agents. Ammonia appears to be more desirable as an alkaline agent to disperse fatty acids and to form soaps which are useful in emulsification than caustic soda or potash, which are not volatile and would probably act detrimentally on the ware over a period of time.

It will be understood that we do not desire to limit ourselves to the use of ammonia alone as an alkaline agent, since various volatile amines, for example, may be employed. Again, the present invention is not limited to the use of fatty acids alone, in view of the fact that fatty acids associated with oils or fats from which the fatty acids were derived would serve to advantage in certain instances. Artificially prepared soap-forming acids such as are obtained from petroleum may also be used.

The following are examples disclosing formulas of treating compounds used in treating glassware in accordance with the present invention.

Per cent

1. Ammonium stearate _____ 2
   Water _____ 98

2. Ammonium oleate _____ 2
   Water _____ 98

3. An emulsion of 2% of light paraffin oil in 0.1% solution of ammonium oleate, the balance being water.

4. An emulsion of 2% heavy bright stock mineral oil in 1.0% ammonium oleate, the balance being principally water.

5. 2% of an ammonium soap made from the mixed fatty acids obtained from corn oil, the balance being water.

6. Crude scale paraffin wax 4.40%, stearic acid .45%, triethanolamine .15%, water 95%.

In our prior co-pending application, Serial No. 737,637, filed July 30, 1934, we have set forth a method of treating glass wool with lubricating films and the present invention, therefore, constitutes a continuation-in-part of our aforesaid earlier filed application. In view of the foregoing, it will be seen that the present invention provides a relatively inexpensive process for treating newly formed glass articles and serves effectively in the capacity of preventing or reducing injury and breakage to such glassware during handling or shipment. We have observed that newly manufactured glassware is particularly susceptible to injury through abrasion or the like and this is undoubtedly due to the fact that the exterior surface of such glassware, immediately following manufacture is unusually clean and devoid of any form of protective film, such as may accumulate through use and washing of such ware. When such unusually clean surfaces of glassware rub against one another, there exists a marked seizure or a high frictional, abrasive action which easily mars the glass surfaces or results in breakage. This condition is specifically avoided by treating such glassware in accordance with the present invention and in addition, the present invention makes possible bulk shipment of such glassware without the necessity of carefully crating and wrapping the same with paper.

While we have described our invention in detail, nevertheless, it will be understood that the same is subject to considerable modification without departing from the essential features of the present invention as the same have been set forth in the following claims. The term "fatty acid" in the claims is intended to cover usual fatty acids and/or artificially prepared soap forming acids such as are obtained from petroleum.

What is claimed is:

1. The method of treating newly formed articles of glassware such as bottles, tumblers and the like to minimize interfacial abrasion during handling and shipment of such articles, which consists in applying to said articles after annealing and before shipment, while the latter are in a heated condition of the order of 200° F., an emulsified mixture of oil and water with a fatty acid soap.

2. The method of treating newly formed articles of glassware such as bottles, tumblers and the like to minimize injury thereto during handling and shipment, which comprises applying to the surfaces of such articles of glassware after annealing and before shipment while the latter are in a heated state of the order of 200° F., a dilute solution of a fatty acid in ammonia water, and removing the volatile compounds of the solution liberated by contact with the heated surfaces of the glassware.

ROBERT C. WILLIAMS.
HUGH M. BONE.